United States Patent
Staring

(10) Patent No.: US 7,110,546 B2
(45) Date of Patent: Sep. 19, 2006

(54) SYNCHRONIZATION OF SESSION KEYS

(75) Inventor: Antonius A. M. Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 680 days.

(21) Appl. No.: 09/734,777

(22) Filed: Dec. 12, 2000

(65) Prior Publication Data
US 2001/0007127 A1 Jul. 5, 2001

(30) Foreign Application Priority Data
Dec. 10, 1999 (EP) ................................. 99204182

(51) Int. Cl.
H04L 9/16 (2006.01)

(52) U.S. Cl. ....................................... 380/260; 380/277
(58) Field of Classification Search ................ 380/260, 380/259, 277, 278, 44, 47; 713/200–202, 713/160, 161
See application file for complete search history.

(56) References Cited

U.S. PATENT DOCUMENTS

| 5,574,785 | A | | 11/1996 | Ueno et al. ..................... 380/2 |
| 5,706,348 | A | * | 1/1998 | Gray et al. ................. 713/160 |
| 5,805,705 | A | * | 9/1998 | Gray et al. ................. 713/160 |
| 5,956,402 | A | * | 9/1999 | Vo .............................. 380/277 |
| 6,105,133 | A | * | 8/2000 | Fielder et al. .............. 713/169 |
| 6,223,285 | B1 | * | 4/2001 | Komuro et al. ............. 713/160 |
| 6,542,610 | B1 | * | 4/2003 | Traw et al. ................. 380/262 |

* cited by examiner

Primary Examiner—Emmanuel L. Moise
Assistant Examiner—Zachary Davis
(74) Attorney, Agent, or Firm—Larry Liberchuk

(57) ABSTRACT

In a communication system for a secure transfer of information from a source device to a sink device in a communication session in the form of a plurality of packets from the source device to the sink device, a packet structure is used with a key check block field. During the session, the source device can change the session key used to encrypt data (including the key check block) in the packet. The sink device detects a change of session key by decrypting only the key check block field with a plurality of candidate keys. The key that gave a valid decryption is used for decrypting the remainder of the packet.

12 Claims, 4 Drawing Sheets

SYNCHRONIZATION OF SESSION KEYS

The invention relates to a secure communication system and method wherein information is transferred between a source and at least one sink device in a communication session including the transfer of a plurality of packets from the source device to the sink device, where data in the packets is encrypted under control of dynamically changed session keys. The invention further relates to a sink device for use in such a system and to software executable by the sink device.

Protocols employed for protecting data during transmission via a communication channel generally consist of a number of distinct phases. For example, the protocol may consist of the following five phases. During the first phase, the authentication phase, the source and sink devices authenticate each other. In the second phase, the key exchange phase, random numbers and key material are created, encrypted, and exchanged. During the third phase, the key generation phase, a session key is created using exchanged key material. In the fourth phase, the information transmission stage, the content is encrypted using the session key, transferred from the source to the sink device, and decrypted by the sink device using the same session key. Finally, in the fifth phase, the key update phase, the session key is updated. The key update phase is periodically executed during phase four. The main purpose of the key update phase is to assure that the breaking of a single session key will cause only limited exposure of the content.

In many systems, a sequence of session keys is generated using an algorithm that is known to both the source and sink devices. This algorithm is initialized with the key material that both devices have exchanged in the key exchange phase. Usually, the source device controls when the session key is updated. This raises the issue of synchronizing the key updates in the source and the sink device.

Most digital communication systems, such as IEEE 1394, and USB, transmit data in a series of packets. In some systems a special field can be allocated in the unencrypted packet header to synchronise session key updates. The source device could then set an update flag in this field to signal a change of session key. However, if a content protection mechanism must be retrofitted to an existing communication system, it is usually not possible to add fields to the packet header. In that case, a special field can be allocated in the (unencrypted part of the) data field (also referred to as payload field) of the packet. In both cases, the update flags are in the clear, providing attackers with some information.

It is known to remedy this deficiency by decrypting the data field of the packet with the current session key, as well as the next key in the sequence of keys, and choose the key for which the decrypted data makes sense. Using this method, the change-over from one session key to the next is automatically detected. However, to determine whether the decrypted data makes sense requires knowledge about the information being transmitted. This is not always the case, limiting the use of this method.

It is an object of the invention to provide a secure communication system, sink device and secure communication method which overcome above mentioned drawback.

To meet the object of the invention, a secure communication system includes a source device and at least one sink device; information being transferred from the source device to the sink device in a communication session including the transfer of a plurality of packets from the source device to the sink device; each packet including a data field for transferring a portion of the information;

the source device including:
a key generator for, at the initiative of the source device, generating an active source session key in a predetermined sequence of source session keys $Ksource_i$;
an encryptor for encrypting at least part of the data field of a packet under control of the active source session key; the encrypted part of the data field including a sub-field designated as a key check block field;

the sink device including:
a key generator for generating a plurality of candidate sink session key in a predetermined sequence of sink session keys $Ksink_i$, where for each index i in the sequence the respective sink session key $Ksink_i$ corresponds to the respective source session key $Ksource_i$;
a decryptor for decrypting at least part of the data field of a received packet under control of a sink session key;
a key resolver operative to determine which of the candidate sink session keys corresponds to the source session key used to encrypt the encrypted part of a received packet, by causing the decryptor to decrypt the data in the key check block field of the received packet under control of each time a different one of the plurality of candidate sink session keys until a valid decryption result is found; and to cause the decryptor to decrypt a remaining encrypted part of the data field of the packet under control of the candidate sink session key which produced the valid decryption result.

By including a separate key check block, which is independent of the other data in the packet, the sink device can easily verify which of the candidate sink session keys should be used for decrypting the data. In this way the sink device needs no a-priori knowledge of the encrypted data being transferred. Moreover, the key check block can be relatively short (e.g. the size of one block for a CBC cipher), so that only a small part of the encrypted information needs to be decrypted under control of more than one key. The major part of the encrypted data needs only to be decrypted under control of the identified sink session key. Normally, only two candidate session keys will be used. Also more candidate keys may be tested, for instance to overcome a loss of a packet during transmission. Preferably, the session key is not changed for each successive packet, to reduce the effort in generating keys. In this case, the set of candidate sink session keys will include the currently selected sink session key $Ksink_i$ and at least one sink session key $Ksink_{i+1}$ next in sequence; where the currently-selected sink session key $Ksink_j$ corresponds to the source session key $Ksource_j$ used for encrypting the encrypted part of a previously received packet. It will be appreciated that whenever the sink device detects a change of session key, the sink device will normally generate a next candidate sink session key for inclusion in the set of candidate keys tested for the next packet.

As defined in the measure of the dependent claim 2, the content of the key check block may be public. This makes the verification of the candidate keys very simple. The decryption results for each of the candidate keys can simply be compared to the public key check block; the match indicates the sink session key which corresponds to the source session key used for encrypting the encrypted data in the packet.

As defined in the measure of the dependent claim 3, the data block is agreed for the entire communication session. The agreement can be made as part of the key generation phase where the exchanged key material is used to generate a key check block. By having a key check block which is fixed during the entire session, the key update process remains simple. If a block cipher in CBC mode is used to encrypt the data of the packet, it is preferred that the key check block has the same length as (or a multiple of) the block size of the encryption algorithm. Unfortunately, this results in a weakness of the system, because the encrypted key check block (which usually is a block at a predetermined position in the data field of the packet), in combination with the (publicly) known key check block provides the information for an exhaustive key search. By not using a public key check block the security is increased.

As defined in the measure of the dependent claim 4, the key check block changes during the session. This increases the security and reduces the chances of a successful exhaustive search within one communication session.

As defined in the measure of the dependent claim 5, a predetermined algorithm is used to generate the key check block and to effect a change of block. The key check block generator may be very simple, like generating a cyclic number sequence. Also more complex algorithms may be used similar to those for generating the session keys. For instance, a random number generator could be used, initialized by key material exchanged during the key exchange phase. The moment of change of the key check block may be predetermined (e.g. each 100-th packet, or each packet). Advantageously, the moment of change depends on the moment of change of the session key. For instance, if a change of session key is detected this also signals a change of key check block.

As defined in the measure of the dependent claim 6, the key check block depends on data of a preceding packet, such as the immediately preceding packet. The key check block may be derived from data in a preceding packet using a suitable algorithm. Since the data itself will normally vary significantly, a relatively simple algorithm may be used to generate the key check block. If desired, also strong algorithms, such as a hashing algorithm, may be used.

As defined in the measure of the dependent claim 8, the key check block is a direct 'copy' of part of the data in a preceding packet. In this case, preferably such a data part is transferred in an encrypted form, where the key check block used for verifying the key of a next packet is formed by the plain-text form of that data part in the preceding packet. Since normally data changes in successive packets, also the key check block changes. By using this changing data, no algorithms are required to generate a sequence of key check blocks, nor does any additional information needs to be added to signal a change of key check block. In a preferred embodiment, the key check block field is located at the beginning of the encrypted part of the data field, allowing for a quick identification. Preferably, the data block containing the (encrypted) data for the next key check block is located in the second or last block of the encrypted part of the data field.

To meet the object of the invention, a method of secure communication between a source device and at least one sink device is provided; information being transferred from the source device to the sink device in a communication session including the transfer of a plurality of packets from the source device to the sink device; each packet including a data field for transferring a portion of the information; the method including:

at the initiative of the source device generating an active source session key in a predetermined sequence of source session keys Ksource$_i$;

encrypting at least part of the data field of a packet under control of the active source session key; the encrypted part of the data field including a sub-field designated as a key check block field;

transferring the packet from the source device to the sink device;

generating a plurality of candidate sink session key in a predetermined sequence of sink session keys Ksink$_i$, where for each index i in the sequence the respective sink session key Ksink$_i$ corresponds to the respective source session key Ksource$_i$;

determining which of the candidate sink session keys corresponds to the source session key used to encrypt the encrypted part of a received packet, by decrypting the data in the key check block field of the received packet under control of each time a different one of the plurality of candidate sink session keys until a valid decryption result is found; and decrypting a remaining encrypted part of the data field of the packet under control of the candidate sink session key which produced the valid decryption result.

These and other aspects of the invention will be apparent from and elucidated with reference to the embodiments shown in the drawings.

Figure 1:
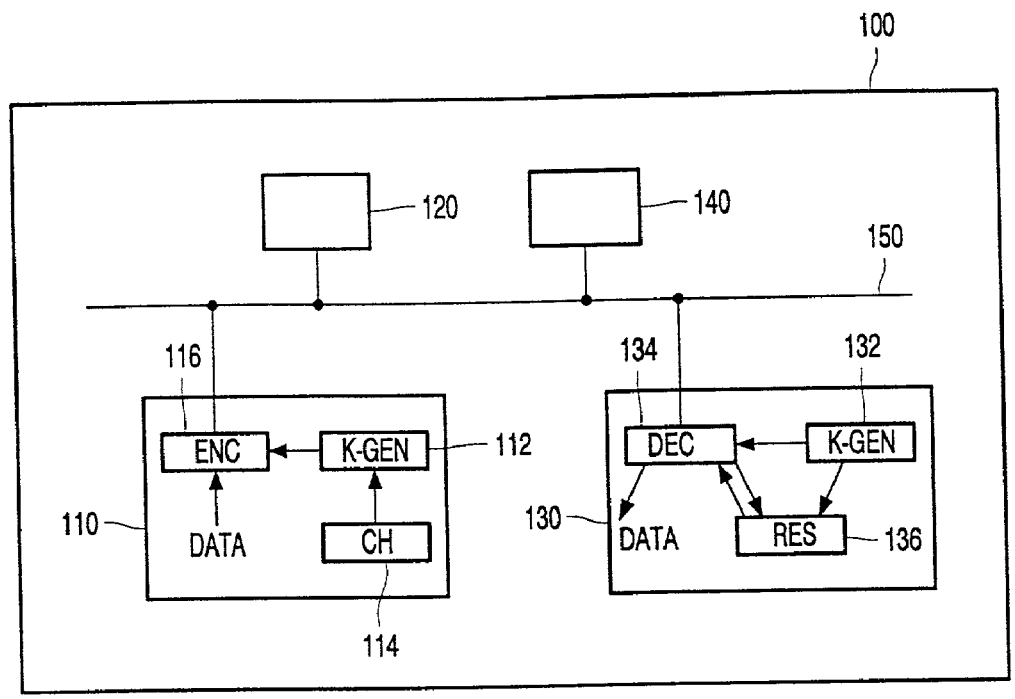
FIG. 1 shows a block diagram of the system 100 according to the invention.

FIG. 1 shows a block diagram of the system 100 according to the invention. The system includes at least one source device, shown are devices 110 and 120, and at least one sink device, shown are 130 and 140. The devices can communicate via a communication medium 150. This may be any suitable communication medium, either wired or wireless. The communication may be for local purposes, e.g. throughout a house or in a smaller cluster, like a cluster of audio/video equipment, or a cluster of a computer with peripherals. The communication may also be in a wide area, e.g. using Internet with access via telephone lines or a cable network, or some form of satellite communication. Normally, the communication is bi-directional. FIG. 1 shows details of the source device 110 and of the sink device 130. In the description it is assumed that information (i.e. the actual data, such as a video program or an audio title) is sent from one source device to one sink device. In practice more than one sink device may receive the information (e.g. using separate communication channels or broadcasting/multicasting techniques). The devices include conventional means to transmit and receive packets via the medium 150. Depending on the medium, such means may be formed by a telephone or cable modem, or a bus interface.

Figure 2:
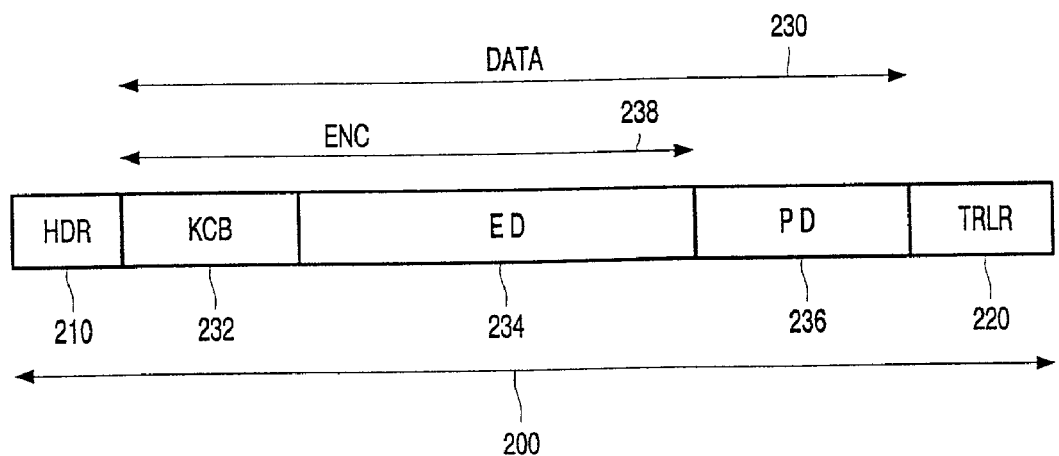
FIG. 2 shows an exemplary packet structure.

FIG. 2 shows an exemplary packet structure 200 for transfer of a portion of the information from the source device to the sink device. Normally the information is transferred in one session which includes a sequence of packets, where the packets carry a portion of the information to be transferred. The source and sink device perform a number of operations only once for a session, like setting up a communication channel and exchanging the basic key material. Normally, the packet 200 includes a header field 210, which may enable a low-level synchronization of the receiver in the sink device, and which normally includes information identifying the sink device (and optionally the source device) and/or a communication channel. The header 210 may also include information such as a packet type. In itself the header does not form part of the invention. The packet 200 may also include a trailer field 220, which may indicate the end of the packet and may include information such as a checksum (e.g. in the form of a CRC). Also the trailer field 220 is not part of the invention. The packet includes a data field 230 (also referred to as payload field), for holding data bytes to be transferred from the source device to the sink device. Usually at the beginning of a session, instructions and specific data are carried in the data field to start the session (usually using asynchronous packets). Once the session has actually started, the data field is normally mainly used for carrying parts of the information to be transferred (using either asynchronous or isochronous packets, depending on the application and communication system). For the invention it is not relevant whether the information to be transferred in a secure way is exchanged using asynchronous type of packets or using an isochronous form of communication (or even a mix of both). As shown in FIG. 2, the data field contains a key check block (KCB) sub-field 232. The KCB field is encrypted by the source device (or under control of the source device) using a session key selected by the source device. Normally, during the exchange of information also the remainder of the data field 230 is encrypted using the same session key. In certain situations it may not be necessary to encrypt all data. In such a case, in addition to the KCB sub-field 232 the data field has an encrypted data (ED) sub-field 234 and a plain data (PD) sub-field 236. So, both the KCB and the ED sub-fields are encrypted as indicated by 238. In the remainder it is assumed that all data in the data field 230 is encrypted.

Referring to FIG. 1, the source device 110 includes a key generator 112 for generating a source session key in a predetermined sequence of source session keys $Ksource_i$. The key generator needs only to generate one session key at a time. For the description it is assumed that the data in one packet is encrypted under control of only one key. If desired, a person skilled in the art can easily modify the system to encrypt different parts of the data in one packet using different algorithms and/or different keys. Any suitable key generation algorithm may be used. For instance, a random number generator may be used fed by initial key information exchanged between the source and sink device. A key changer 114 triggers the key generator 112 to generate a source session key for use as the active source session key for at least one packet to be encrypted next. The algorithm controlling the key change can be very simple, e.g. every successive packet may be encrypted using a next session key, or at regular times like every second (e.g. controlled by a timer) a next session key may be used. An encryptor 116 is used to encrypt at least part of the data field of a packet under control of the active source session key. As described for FIG. 2, the encrypted part of the data field includes a sub-field designated for holding a key check block. Any suitable encryption algorithm may be used, like DES operating in the CBC mode.

The sink device 130 includes a key generator 132 for generating a sink session key in a predetermined sequence of sink session keys $Ksink_i$. The sequence of source and sink keys correspond. So, for each index i in the sequence the respective sink session key $Ksink_i$ corresponds to the respective source session key $Ksource_i$. The details of the correspondence between the keys is determined by the encryption/decryption algorithm used. For instance, for a symmetrical encryption algorithm, like DES, the decryption key is the same as the encryption key. For an asymmetrical algorithm, like RSA, a predetermined relationship exists between the encryption and decryption key, which ensures that the decryption process gives an inverse effect compared to the encryption process. The sink device 130 also includes a decryptor 134 for decrypting at least part of the data field of a received packet under control of a sink session key. The decryptor 134 operates 'inverse' compared to the encryptor 116, assuming that corresponding keys are used. The sink device also includes a key resolver 136 which tests a plurality of candidate sink session keys by checking which of those keys successfully decrypts the key check block. To this end, the key resolver 136 is operative to cause the decryptor 134 to decrypt the data in the key check block field of a received packet under control of a plurality of candidate sink session keys. Preferably after each decryption, the key resolver 136 verifies whether the tested candidate sink session key produced a correct decryption result of the key check block transferred via the key check block field. This is repeated until the key has been found. The candidate key that produced a correct decryption result, is then selected for further use. The decryptor 134 is used to decrypt a remaining encrypted part of the data field of the packet under control of the selected sink session key. The key resolver 136 can also ensure that the list of candidate sink keys is kept up to date. So, if a change of key has been detected, preferably at least one new candidate is added to the set of candidate sink session keys. To this end, if a candidate sink session key other than the currently selected sink session key $Ksink_i$ produced a correct decryption result of the key check block, the key resolver 136 ensures that the key generator 132 generates a next sink session key as a candidate sink session key. If the system supports 'skipping' of session keys (e.g. to overcome loss of one or more packets during the transmission), the key resolver 136 preferably detects that the correct sink session key was not the next one in sequence, but a session key one or more places further in the sequence, and ensures that all skipped keys are removed from the set of candidate sink session keys and that the set is updated with the required new number of candidate keys. How the key generator verifies that the decryption of the data in the key check block is valid, depends on the way the key check block is defined. Various alternative ways are defined below.

In an embodiment, the plain-text form of the key check block (i.e. the reference key check block) transferred in the key check block field is a public data block. This makes it very simple to verify which candidate sink key corresponds to the sink key used for encrypting the received packet. For instance, the first candidate sink key may be used to decrypt the data in the key check block field. If the decrypted data matches the reference key check block, this candidate key is the desired key. If not, the next candidate key can be used until a match has been found. The reference key check block (public data block) can be stored in permanent memory, such as a ROM.

In an embodiment, the plain-text form of the key check block transferred in the key check block field is a data block agreed between the source and sink device before starting the transfer of the information and used for the entire communication session. The data block used as the plain-text form of the key check block (i.e. the reference key check block) is preferably agreed using a secure method. Any suitable method may be used, for instance based on public key encryption. Preferably, the reference key check block is derived from the key material exchanged at the beginning of the session, making it unnecessary to add any further secret exchange of data. The way to verify the candidate key is the same as described above. However, in this case the reference key check block is preferably stored in a rewriteable memory. Preferably, such a memory is secure against access by hackers.

Figure 3:
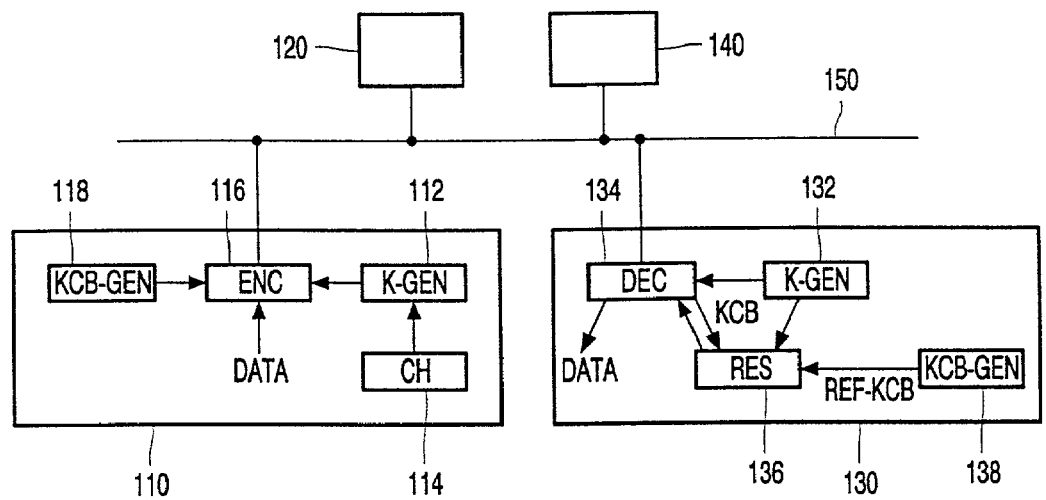
FIG. 3 illustrates a block diagram of an embodiment wherein the reference key check block is dynamically changed.

In an embodiment, the plain-text form of the key check block (the reference key check block) in the key check block field changes at least once during the communication session. FIG. 3 illustrates a way of achieving the dynamic change of the reference key check block. In this embodiment, the source device 110 includes a key check block generator 118 for generating the plain-text form of the key check block. Preferably, the key check block generator 118 also effects the change of the reference key check block (e.g. after a predetermined number of packets have been sent or after a predetermined time has elapsed). The sink device 130 includes a corresponding key check block generator 138. The source device may trigger a change of the key check block, for instance via setting a flag in a packet (preferably transferred in encrypted form), or linked to a change of the session key. Alternatively, the sink device may use the same algorithm as the source device to trigger a change of reference key check block.

Figure 4:
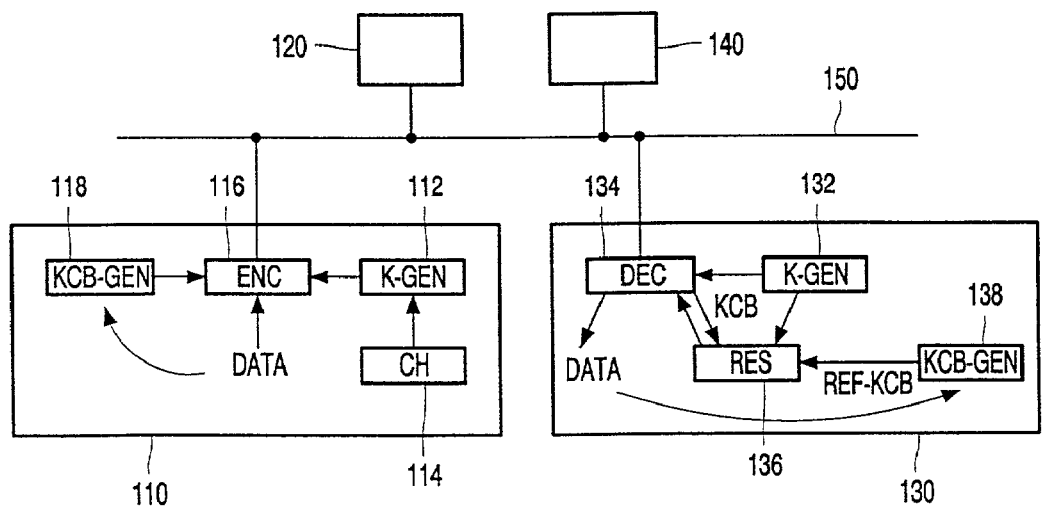
FIG. 4 illustrates a preferred embodiment for achieving a dynamically changing reference key check block.

FIG. 4 illustrates a preferred embodiment for achieving a dynamically changing reference key check block. In this embodiment, the change of the reference key check block is achieved by deriving the reference key check block from information transferred in a packet preceding the particular packet for which the key check block is actually used. To this end, the data of a preceding packet is fed to the key check block generators 118 and 138 as shown in FIG. 4. The key check block generators may use a suitable algorithm to derive the reference key check block from data in a preceding packet. Since the data itself will normally vary significantly, a relatively simple algorithm may be used to generate the key check block. If desired, also strong algorithms, such as a hashing algorithm, may be used. It is preferred to derive the reference key check block from an immediately preceding packet.

Figure 5:
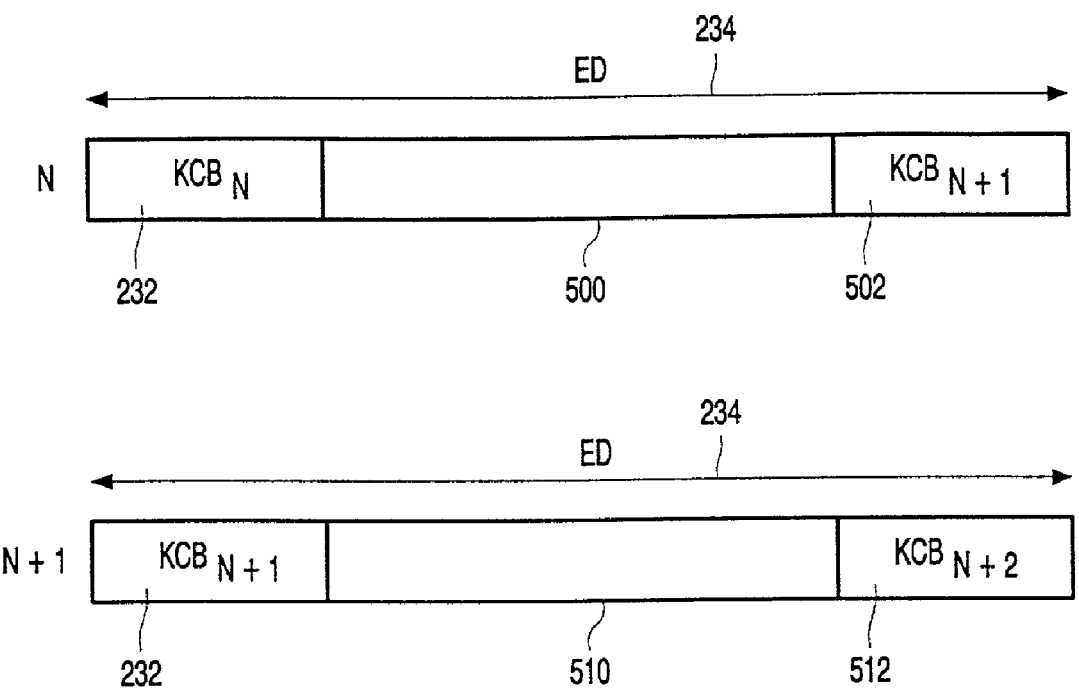
FIG. 5 shows a preferred packet structure.

In a preferred embodiment, the plain-text form of the key check block of a particular packet is identical to the plain-text form of a predetermined data block, other than the key check block, in an encrypted part of the data field of a packet preceding the particular packet. This is illustrated in FIG. 5. Packet 500 represents the N-th packet of the sequence of packets. Packet 510 represents the N+1-th packet of the sequence of packets. Only the encrypted parts of the packets are shown. The key check block $KCB_N$ in field 232 of packet 500 is used to verify which key was used to encrypt packet 500. The packet 500 also includes the reference key check block $KCB_{N+1}$ 502 which will be used to verify which key was used to encrypt the next packet 510. In the figure shown, the reference key check block $KCB_{N+1}$ 502 forms the last block of the encrypted data field 234 and contains the normal data transferred from the source to the sink device (so $KCB_{N+1}$ 502 is not specially generated). It will be appreciated that in the example $KCB_{N+1}$ 502 is encrypted with the same source session key as the other data in field 234 of packet 500. The plain-text form of $KCB_{N+1}$ 502 is used as the reference key check block for verifying packet 510. To this end, packet 510 includes the reference key check block $KCB_{N+1}$ in the key check block sub-field 232, but now encrypted with the source session key used for this packet (which may the same as used for the previous packet). Note that this does not leak information since both blocks are encrypted. Using a suitable encryption algorithm, like one with a feedback mode such as the CBC encryption mode, the encrypted form of $KCB_{N+1}$ 502 in packet 500 is not the same as the encrypted form of $KCB_{N+1}$ in field 232 of packet 510 even if the same session key was used, ensuring that it is not possible to detect a change of session keys by comparing these blocks. Therefore, no information leaks concerning a possible session key update. In addition, since each packet starts with a different key check block and a suitable encryption algorithm, like the CBC encryption mode, is used within the packet, possible information leaks due to the presence of widely known data blocks (e.g. MPEG headers which may occur frequently in certain information to be transferred) at the start of the packet is mitigated as well. Using the mechanism of FIG. 5, preferably the first key check block (used for the first packet in the sequence) is determined from the information exchanged between the source and sink in the key exchange phase.

To check which session key is to be used for the current packet, only the first block needs to be decrypted using the current session key as well as the next session key. If the size of the key check block is equal to the block size of the cipher, the result unequivocally determines the correct session key, since it is known what key check block to expect. If the key check block is shorter than the cipher block size, there is some probability that the result is indecisive.

It will be appreciated that the concepts described above can easily be expanded on by using the key check block, either the front or the rear key check block, or a combination of both, to derive the session key or the initialisation vector that is required for using a block cipher in CBC mode.

It should be noted that a loss of packet (and therefore the loss of the key check block to be used for the verifying the session key of the next block) can be overcome. Referring to the situation shown in FIG. 5 and assuming that packet N+1 was lost, the sink device might try to decrypt $KCB_{N+2}$ in field 232 of packet N+2 with both possible candidate sink session keys and compare the outcome with the plain-text form of $KCB_{N+1}$ 502 of packet N. Even though one of the candidate keys is correct, no match will be found since $KCB_{N+1}$ 502 should not have been used (instead the lost $KCB_{N+1}$ 512 should have been used). Next, the last data block of packet N+2, holding the key check block to be used for packet N+3, should be decrypted with both candidate keys. One of the decryptions will give the valid reference key check block $KCB_{N+3}$. Next the key check block field 232 of packet N+3 is decrypted with all candidate keys (if the key can change between each packet, the set of candidate keys may now include three keys). By comparing the decryption results to the two candidate plain-text forms of $KCB_{N+3}$, with a high likelihood only one match is found. This match identifies the key to be used for packet N+2 (namely that key which gave the correct decryption of $KCB_{N+3}$ in packet N+2) as well as the key to be used for packet N+3 (namely that key which gave the correct decryption of $KCB_{N+3}$ in packet N+3). A person skilled in the art can easily extend this principle to overcome a loss of more than one packet.

PREFERRED EMBODIMENT

Figure 6:
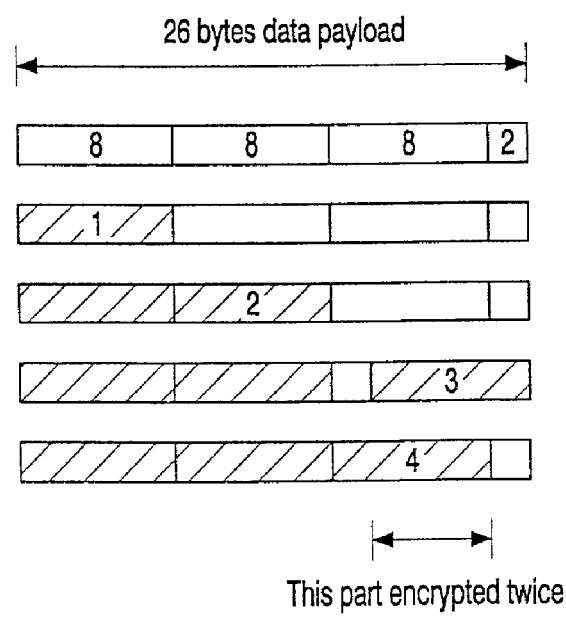
FIG. 6 illustrates the Cipher Text Stealing method.

The block cipher is preferably the Digital Encryption Standard (DES) in Cipher Block Chaining (CBC) mode. To preserve data payloads and to minimize data payload overhead, Cipher Text Stealing CTS) is preferably used. The DES algorithm uses an 8-byte block-length to operate on. Therefore, whenever the data payload is not a multiple of eight bytes, some measures must be taken to encrypt the last data block, which contains less than eight bytes. One alternative is to add padding bytes so that the block-length equals eight again. However, this increases the data payload size and in addition, the number of padded bytes must be conveyed to the decrypting side to remove the padding bytes correctly. A better method is to use Cipher Text Stealing. All 8-byte blocks are encrypted sequentially except for the last 8-byte block and the remaining bytes in the last 'incomplete' data block. These bytes are concatenated into one extended block and treated separately. The extended block-length thus ranges between 9 and 15 bytes. First the last eight bytes in the extended block are encrypted in place. Next, the first eight bytes in the extended block are encrypted. This means that some bytes are encrypted twice. FIG. 6 illustrates how the CTS method operates. As an example, assume a data payload size of 26 bytes. This yields three 8-byte data blocks plus an additional 2-byte data block. Blocks 1 and 2 can be encrypted in a straightforward manner. However, instead of encrypting block 3 next, the last eight bytes of the concatenation of block 3 and 4 are encrypted. Finally, block 3 is encrypted. Note that part of block 3 was already encrypted in the previous stage and is encrypted again in the last stage. During decryption, the process is simply reversed. Blocks 1 and 2 are decrypted. Then block 3 is decrypted, yielding the first part fully decrypted and the second part still encrypted. Finally, the last eight bytes of the total data payload are decrypted. This technique leaves the total data payload unchanged. However, it can only be applied when the total data payload size is greater than eight.

Another suitable Cipher Text Stealing method is described in 'Applied Cryptography' second edition of Bruce Schneier, pages 195–196 and FIG. 9.5. Referring to the example of FIG. 6, the first two plain text blocks $P_1$ and $P_2$ are encrypted in the conventional way using a Cipher Block Chaining mode. So, $P_2$ is combined (XOR-ed) with the ciphertext $C_1$ of the encryption outcome for the first block and encrypted giving $E_k(P_2 \oplus C_1) = C_2$. The third block $P_3$ is also encrypted conventionally, giving $E_k(P_3 \oplus C_2)$. In the example, the last plaintext block P4 contains only 2 bytes. This number of bytes is taken from the beginning of the encryption outcome and used as the ciphertext for block 4. This can be represented as: $E_k(P_3 \oplus C_2) = C_4 | C'$ (where "|" represents a concatenation). C' is not transmitted. The last block $P_4$ is padded (in this example six bytes are added), represented by $P_4|PAD$ (for the padding bits any bit value may be used). As normal, this is combined with the previous encryption outcome and encrypted, giving the third ciphertext block $C_3 = E_k((P_4|PAD) \oplus (C_4|C'))$. $C_3$ and $C_4$ are transmitted. In the receiving system, first $C_3$ is decrypted, giving $(P_4|PAD) \oplus (C_4|C')$. Next C4 is padded with the same PAD bits. The result is XOR-ed with the decryption result, giving: $(C_4|PAD) \oplus ((P_4|PAD) \oplus (C_4|C')) = (P_4|C')$. This provides $P_4$ and C'. Next $C_4$ is padded with C' and decrypted, giving $P_3 \oplus C_2$. By XOR-ing this with $C_2$ access is obtained to $P_3$.

The preferred method is based on in-band key change signaling and therefore provides highly accurate key change synchronization between the Host (source device) and the device (sink device). Session key changes are only allowed in between packets so that a key change can never occur in the middle of a packet. Further, the Host and device agree on the same algorithm to calculate session keys so that once initialized, the Host and the device can independently calculate subsequent session keys. A next session key is calculated immediately after the previously calculated session key is consumed so that it is ready for the next session key change.

The sender retains the last clear-text eight bytes from the previous packet, called the key check block, and encrypts this block with the current session key. The Host may have decided to change the session key between the previous packet and the current packet. In this case, the key check block gets encrypted with a different session key than the one used to encrypt the last eight bytes from the previous packet. The key check block is sent to the receiver as a header of the current encrypted data payload. The receiver also retains the last eight bytes of the previous packet (after decryption). When receiving the current packet, it decrypts the first eight bytes (the key check block) and compares the result to the retained last eight bytes from the previous packet. If there is a match, the session key did not change in between packets and decryption can continue. If there is no match, the receiver switches to the next session key and re-decrypts the key check block. If there is a match, a session key change has occurred and the receiver proceeds, using this new session key. If there is no match, an error occurred and the receiver takes appropriate action. Note that because of the 8-byte key check block addition, the actual data payload of the packet is always greater than eight bytes and the Cipher Text Stealing method can always be applied. If the actual data payload is less than eight bytes (total payload less than 16 bytes) the receiver must fully decrypt the entire packet due to CTS to retrieve the key check block. The advantage of this method is that it hides the session key change events in the encrypted data. The key check block must be decrypted before the session key change events can be determined.

Figure 7:
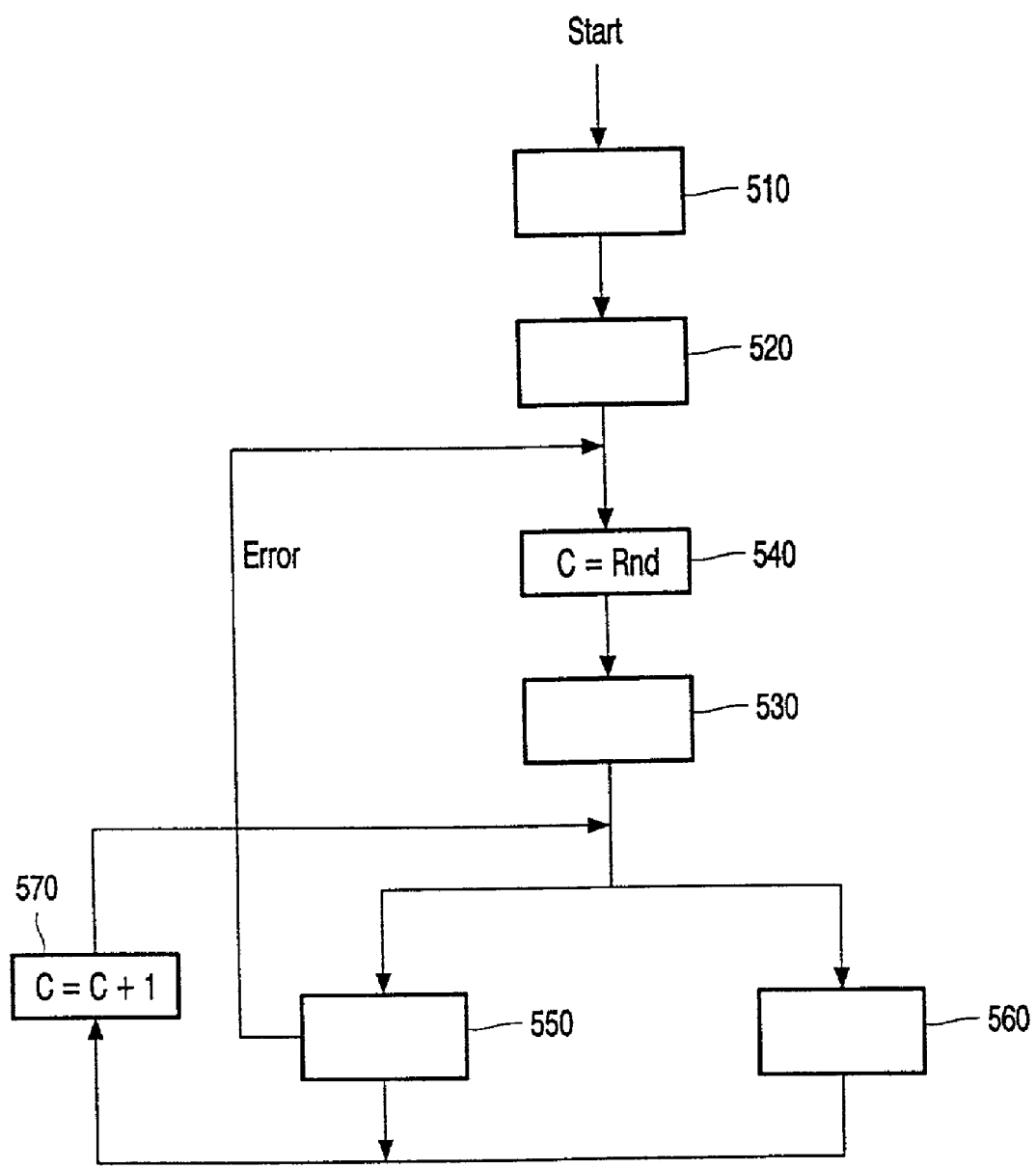
FIG. 7 shows the protocol steps in a preferred embodiment.

The preferred protocol has four phases. The first phase is the authentication phase where the Host and device authenticate each other. The second phase is the key exchange phase where random numbers and key material are created, encrypted and exchanged. The third phase is the key generation phase where the key material is used to create a session key. After initialization this phase can run multiple times to generate new session keys. The fourth phase is the information transmission stage where the content is securely transferred between the Host and the device using session keys, generated in the third phase. For a complete implementation, the previously defined phases are executed and repeated according to the scheme shown in FIG. 7. Before any content can be exchanged, the system enters phase 1, the authentication phase in step 510. A trusted relationship is established during this phase. Once this is done, the second phase is entered in step 520 where key material is exchanged in a secure way. Also, an initial key check block (IKCB) is securely sent from the Host to the device. This block must be retained by both the Host and the device for the entire duration of the trusted relationship.

Before entering the third phase in step 530 for the first time, a 32-bit counter C is initialized with a random number in step 540. The Host conveys this number to the device through a Init_C request. Both the Host and the device calculate an initial session key(C). Then the information transmission phase is entered and the actual data transfer is started. At the same time, immediately after entering phase 4 in step 550, the Host and the device calculate the next session key (C+1) in step 560. While the information transmission phase is going on, the sender may decide to update the current session key. At a certain moment in time, it starts using session key (C+1) that has been previously calculated. The receiver notices the session key change and in turn also starts using session key (C+1). Both Host and device then enter phase 3 again after incrementing counter C in step 570. This results in the generation of a new session key (C+1), ready to be used during the next session key change. This process is repeated until all the data has been transmitted. It is at the sole discretion of the sender to decide when to reenter phase 3 to update the session key.

In general, two cases need to be considered:

The protocol is used to protect streaming content. In this case, the sender might decide to update the session key, based on a timer event, which fires periodically and triggers the session key change event.

The protocol is used to protect the transfer of a block of content. This block could either contain the content itself (a file) or any keys needed to decrypt encrypted content. In this case, the sender could decide to update the session key before the start of every block transfer so that each block is encrypted, using another session key.

The Host and device session key generation process might get out of synchronization. Especially when dealing with streaming content, packets might get lost or damaged so that session key change events cannot be detected reliably anymore. Whenever an interruption in the data stream occurs, the receiver notifies the sender. At this time, both the Host and the device are aware that there is a potential disruption of the session key synchronization. The Host then resynchronizes the session key generation process by issuing an Init_C request. After successful completion, both the Host and the device are synchronized again and the information transmission phase can proceed.

Note that depending on the application, not all phases need to be implemented. For example, it may suffice to go through the authentication phase only to establish a trusted relationship between Host and device. Each Content Security Method (CSM) descriptor contains sufficient information for the Host to determine which phases it needs to go through.

Many of the functions described above for the source and the sink device will normally be performed by a processor loaded with suitable software. For performance reasons, certain functions, like the encryption/decryption, may be performed by dedicated hardware. At this moment, usually also hardware, such as a communication IC, is used for transferring data via the communication medium. The processor, such as a PC-type processor, micro-controller or DSP-like processor, can be loaded with a program to perform the steps according to the invention. The program is usually loaded from a background storage, such as a hard disk or ROM. A computer program product can be used, for instance, to initially store the program in the background storage. Such a program product may be distributed on a storage medium, like a CD-ROM, or via a network, like the public Internet.

The invention claimed is:

1. A secure communication system including
   a source device and
   at least one sink device; information being transferred from the source device to the at least one sink device in a communication session including the transfer of a plurality of packets from the source device to the at least one sink device; each packet including a data field for transferring a portion of the information;
   the source device including:
      a key generator for, at the initiative of the source device, generating an active session source key in a predetermined sequence of source session keys $Ksource_i$;
      an encryptor for encrypting at least part of the data field of a packet under control of the active source session key; the encrypted part of the data field including a sub-field designated as a key check block field that contains a key check block such that a plain-text form of the key check block is a data block agreed between the source and sink devices before starting the transfer of the information;
   the at least one sink device including:
      a key generator for generating a plurality of candidate sink session keys in a predetermined sequence of sink session keys $Ksink_i$, where for each index i in the sequence the respective sink session key $Ksink_i$ corresponds to the respective source session key $Ksource_i$;
      a decryptor for decrypting at least part of the data field of a received packet under control of a sink session key;
      a key resolver operative
         to determine which of the candidate sink session keys corresponds to the source session key used to encrypt the encrypted part of a received packet, by causing the decryptor to decrypt the data in the key check block field of the received packet under control of a different one of the plurality of candidate sink session keys until a valid decryption result is found; and
         to cause the decryptor to decrypt a remaining encrypted part of the data field of the packet under control of the candidate sink session key which produced the valid decryption result.

2. A secure communication system as claimed in claim 1, wherein
   the plain-text form of the key check block in the key check block field is a public data block.

3. A secure communication system as claimed in claim 1, wherein
   the plain-text form of the key check block in the key check block field is the data block used for the entire communication session.

4. A secure communication system as claimed in claim 1, wherein
   the plain-text form of the key check block in the key check block field changes at least once during the communication session.

5. A secure communication system as claimed in claim 4, wherein
   the source and sink devices each include corresponding key check block generators for generating the plain-text form of the key check block and effecting the change of the plain-text form of the key check block.

6. A secure communication system as claimed in claim 4, wherein
   the plain-text form of the key check block of a particular packet is derived from information transferred in a packet preceding the particular packet.

7. A secure communication system as claimed in claim 6, wherein the plain-text form of the key check block is derived from information transferred in a packet immediately preceding the particular packet.

8. A secure communication system as claimed in claim 6, wherein
   the plain-text form of the key check block of a particular packet is identical to the plain-text form of a predetermined data block, other than the key check block, in an encrypted part of the data field of a packet preceding the particular pocket.

9. A sink device for use in a secure communication system wherein a source device autonomously can change a source session key used for encrypting at least part of the data field of a packet transferred from the source device to the sink device; the encrypted part of the data field including a sub-field designated as a key check block field; the sink device including:

a key generator for generating a plurality of candidate sink session keys in a predetermined sequence of sink session keys $Ksink_i$, where for each index i in the sequence the respective sink session key $Ksink_i$ corresponds to the respective source session key $Ksource_i$;

a decryptor for decrypting at least part of the data field of a received packet under control of a sink session key; and a key resolver operative to determine which of the candidate sink session keys corresponds to the source session key used to encrypt the encrypted part of a received packet, by causing the decryptor to decrypt the data in the key check block field of the received packet under control of a different one of the plurality of candidate sink session keys until a valid decryption result is found, the key check block field containing a key check block such that a plain-text form of the key check block is a data block agreed between the source and sink devices before starting the transfer of the information; and to cause the decryptor to decrypt a remaining encrypted part of the data field of the packet under control of the candidate sink session key which produced the valid decryption result.

10. A method of secure communication between a source device and at least one sink device; information being transferred from the source device to the at least one sink device in a communication session including the transfer of a plurality of packets from the source device to the at least one sink device; each packet including a data field for transferring a portion of the information; the method including:

at the initiative of the source device, generating an active session source key in a predetermined sequence of source session keys $Ksource_i$;

encrypting at least part of the data field of a packet under control of the active source session key; the encrypted part of the data field including a sub-field designated as a key check block field that contains a key check block such that a plain-text form of the key check block is a data block agreed between the source and sink devices before starting the transfer of the information;

transferring the packet from the source device to the at least one sink device;

generating a plurality of candidate sink session keys in a predetermined sequence of sink session keys $Ksink_i$, where for each index i in the sequence the respective sink session key $Ksink_i$ corresponds to the respective source session key $Ksource_i$;

determining which of the candidate sink session keys corresponds to the source session key used to encrypt the encrypted part of a received packet, by decrypting the data in the key check block field of the received packet under control of a different one of the plurality of candidate sink session keys until a valid decryption result is found; and decrypting a remaining encrypted part of the data field of the packet under control of the candidate sink session key which produced the valid decryption result.

11. A method of, in a sink device in a secure communication systems detecting a change of a session key effected by a source device in the system; information being transferred from the source device to the sink device in a communication session including the transfer of a plurality of packets from the source device to the sink device; each packet including a data field for transferring a portion of the information; at least part of the data field of a packet being encrypted under control of an active source session key in a predetermined sequence of source session keys $Ksource_i$; the encrypted part of the data field including a sub-field designated as a key check block field; the method including:

generating a plurality of candidate sink session keys in a predetermined sequence of sink session keys $Ksink_i$, where for each index i in the sequence the respective sink session key $Ksink_i$ corresponds to the respective source session key $Ksource_i$;

determining which of the candidate sink session keys corresponds to the source session key used to encrypt the encrypted part of a received packet, by causing the decryptor to decrypt the data in the key check block field of the received packet under control of a different one of the plurality of candidate sink session keys until a valid decryption result is found, the key check block field containing a key check block such that a plain-text form of the key check block is a data block agreed between the source and sink devices before starting the transfer of the information; and decrypting a remaining encrypted part of the data field of the packet under control of the candidate sink session key which produced the valid decryption result.

12. A computer program product, stored in a computer readable medium, where the program product is operative to cause a computer to perform the method of claim 11.

* * * * *